United States Patent
Riedl et al.

(10) Patent No.: US 7,676,826 B2
(45) Date of Patent: Mar. 9, 2010

(54) TECHNIQUE FOR COMMUNICATING RELATIVELY HIGH AND LOW PRIORITY DATA BETWEEN A TERMINAL AND A REMOTE LOCATION

(75) Inventors: Steven E. Riedl, Superior, CO (US); John B. Carlucci, Boulder, CO (US); John A. Stebbins, Golden, CO (US); Jo A. Friedman, Jamestown, CO (US)

(73) Assignee: Time Warner Interactive Video Group, Inc., Stamford, CT (US)

( * ) Notice: Subject to any disclaimer, the term of this patent is extended or adjusted under 35 U.S.C. 154(b) by 1427 days.

(21) Appl. No.: 10/626,114

(22) Filed: Jul. 24, 2003

(65) Prior Publication Data
US 2005/0018691 A1    Jan. 27, 2005

(51) Int. Cl.
H04W 28/06 (2006.01)
H04L 12/56 (2006.01)
(52) U.S. Cl. .............. 725/90; 370/395.42; 370/473
(58) Field of Classification Search ............ 370/394, 370/395.64, 395.42, 244; 725/9, 14, 21, 725/126, 61, 90, 95, 106
See application file for complete search history.

(56) References Cited
U.S. PATENT DOCUMENTS

| | | | | |
|---|---|---|---|---|
| 5,802,051 A | * | 9/1998 | Petersen et al. | 370/395.42 |
| 5,809,023 A | * | 9/1998 | Petersen et al. | 370/395.1 |
| 5,867,764 A | * | 2/1999 | Williams | 725/125 |
| 5,909,428 A | * | 6/1999 | Saito et al. | 370/244 |
| 6,041,054 A | * | 3/2000 | Westberg | 370/477 |
| 6,081,533 A | * | 6/2000 | Laubach et al. | 370/395.64 |
| 6,392,664 B1 | * | 5/2002 | White et al. | 725/61 |
| 6,442,147 B1 | * | 8/2002 | Mauger et al. | 370/321 |
| 6,493,342 B1 | * | 12/2002 | Breslow et al. | 370/394 |

\* cited by examiner

Primary Examiner—Andrew Y Koenig
Assistant Examiner—Jasmine Stokely-Collins
(74) Attorney, Agent, or Firm—Ryan, Mason & Lewis, LLP

(57) ABSTRACT

In a cable network providing, among others, interactive video services, data cells carrying real-time data concerning, e.g., trick mode commands (pause, rewind and fast-forward) initiated by a user are instantly transmitted to a headend facility for immediate processing. The invention is premised upon a recognition that such real-time data typically does not fully utilize the transport capacity of the data cells. In accordance with the invention, non-real-time (NRT) data to be transmitted to the headend facility, although accorded a lower priority than the real-time data, is inserted into those underutilized data cells before their transmission, thereby fully exploiting the transport capacity of the data cells.

43 Claims, 3 Drawing Sheets

TECHNIQUE FOR COMMUNICATING RELATIVELY HIGH AND LOW PRIORITY DATA BETWEEN A TERMINAL AND A REMOTE LOCATION

FIELD OF THE INVENTION

The invention relates to communications systems and methods, and more particularly to a system and method for communicating data between a terminal and a remote facility through a communications network, e.g., a cable network.

BACKGROUND OF THE INVENTION

A typical set-top terminal (STT) operating in a cable network regularly generates and transmits data of various types to the cable operator's headend facility. For example, an STT may generate and transmit to the headend facility data pertaining to user commands. This sort of data may include data reflecting channel changes in the context of regular cable television programming, or, alternatively, data pertaining to user commands such as "play," "pause," and "rewind" in the context of a video-on-demand service. An STT may also generate diagnostic data indicating various aspects of the performance of the cable network or of the STT itself.

Often these types of data are sent to the headend facility, where the cable operator collects and organizes the data for various purposes. Many cable operators regularly collect information pertaining to users' channel preferences in order to monitor the popularity of various television shows or to observe viewing habits or other behavior patterns among users. Operators naturally use diagnostic data to monitor and maintain the performance of the cable network and of the various STTs in the network.

Because of network bandwidth limitations, a typical STT cannot send all the data it generates to the cable operator's headend facility in "real-time," i.e., instantaneously. Instead, a typical STT prioritizes the various types of data it generates, sending selected items of data to the headend facility in real-time, while accumulating other data items for transmission at such times as between 2 a.m. and 6 a.m. when the upstream data traffic to the headend facility is typically scarce.

For example, data concerning "play," "pause," "rewind" and "fast-forward" commands initiated by a VOD user is typically transmitted to the headend facility in real-time to enable the user to instantly manipulate a video presentation. On the other hand, statistical data concerning program channel changes, STT on/off, or other user viewing habit or behavior pattern is accorded a lower priority, and is typically stored in an STT memory and transmitted at a later, convenient time to the headend facility. The diagnostic data generated by an STT may also be collected and transmitted to the headend facility at a later time.

However, in many cases the headend facility receives the non-real-time (NRT) data only after a significant delay, which is undesirable. In addition, the capacity of the STT memory for storing the NRT data is limited and, because of the significant delay, may overflow before the STT has an opportunity to send the data to the headend facility, which is also undesirable.

SUMMARY OF THE INVENTION

The invention overcomes the prior art limitations by opportunistically inserting NRT data into data objects containing real-time data (e.g., "play," "pause" "rewind" and "fast-forward" commands) to be transmitted to a remote location (e.g., the headend facility) for immediate processing thereof In prior art, the real-time data is transported in a data object, e.g., an ATM cell, having a predetermined data transport capacity. The invention is premised upon a recognition that the real-time data typically utilizes only a portion of such transport capacity, resulting in unused capacity in the data object. In accordance with the invention, at least some of the NRT data, although accorded a lower priority than the real-time data to be processed in the headend facility, is opportunistically inserted in the data object to utilize the unused capacity. The resulting data object is then transmitted to the headend facility for processing.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

A cable network may provide users with, in addition to TV broadcast, on-demand services such as video-on-demand (VOD), movies-on-demand (MOD), and subscription VOD (SVOD) services. These on-demand services allow a user to exercise a considerable amount of control over a video stream that is being transmitted to the user's set-top terminal (STT). For example, a VOD user at an STT may select a video presentation, from a menu of available programs, to watch at his/her convenience. In such case, the cable operator's headend facility typically responds to the user's video select command by generating a video stream containing the requested program material, and transmitting it to the user's STT. The headend facility is also responsive to trick mode commands (e.g., pause, rewind, fast-forward, etc.) which may be initiated by the user to manipulate such a video presentation.

In the example described above, because the flow of the video stream is controlled by the headend facility, it is imperative that the user's trick mode commands be transmitted in real-time or instantaneously over the cable network to the headend. Thus, the trick mode commands are examples of "real-time data" which needs to be communicated to the headend facility instantaneously. The transport of the real-time data from an STT to the headend facility may be realized using, e.g., asynchronous transfer mode (ATM) technology.

Other types of user commands may not be transmitted to the headend facility in real-time. For example, where a user while watching TV broadcast changes the program channel, or turns off the STT, data representing the respective user command is typically stored in the STT memory and transmitted at a later time to the headend facility. Cable operators may regularly collect such statistical data in order to monitor the popularity of various television shows or to observe other behavior patterns among users. Additionally, many STTs are designed regularly to generate diagnostic data pertaining to their performance, and/or the performance of the cable network. All such statistical and diagnostic data that is not required to be sent immediately to the headend facility is referred to herein as "non-real-time (NRT)" data.

The invention is premised upon a recognition that there is oftentimes unused capacity in the transport of real-time data (e.g., the ATM transport) to a remote location. In accordance with the invention, such unused capacity, e.g., within ATM cells carrying the real-time data, is identified and utilized to also transport at least some NRT data to the remote location in "piggy-back" fashion.

Figure 1:
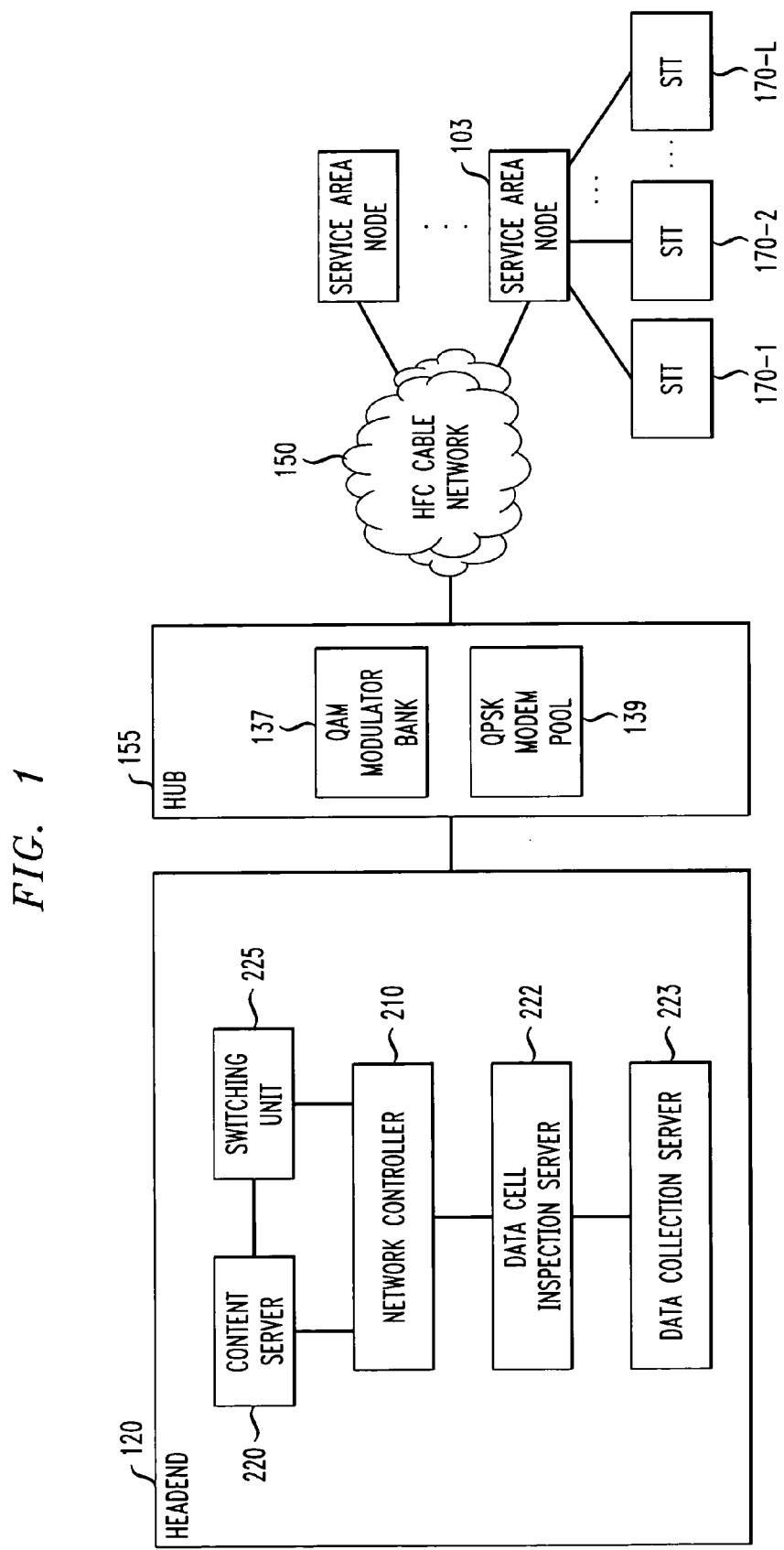
FIG. 1 illustrates components of a broadband communications system in accordance with the invention.

FIG. 1 illustrates components of a broadband communications system, e.g., a cable system, embodying the principles of the invention. In FIG. 1, headend 120 transmits programming content including, e.g., TV programs, downstream to STTs through hybrid fiber coaxial (HFC) cable network 150. For example, STTs 170-1 through 170-L may be in the same neighborhood and each are connected to service area node 103, an interface with network 150, where L represents an integer.

Headend 120 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, resource management services, billing services, etc. Media servers provide time-critical media assets such as MPEG-2 encoded video and audio, MPEG-2 encoded still images, bit-mapped graphical images, PCM digital audio, etc.

In headend 120, content server 220 here generically represents one or more conventional acquisition/staging processors, VOD servers, etc. to provide program materials including, e.g., TV programs, VOD programs, from one or more of the aforementioned sources in the form of program streams, which may be multiplexed and MPEG-2 encoded. In a well known manner, switching unit 225 receives the program streams and, under control of network controller 210, switches the streams to appropriate modulators in quadrature amplitude modulation (QAM) modulator bank 137 in hub 155, where the program streams are modulated onto corresponding "in-band" transmission channels, in accordance with a predetermined QAM scheme. These transmission channels may be 6 MHz bands populating a forward passband, e.g., 350-750 MHz band, of a coaxial cable. It should be noted at this point that the terms "transmission channel" and "program channel" should not be confused. A "transmission channel" signifies a designated frequency band through which a program stream is transmitted. A "program channel" signifies the source of the program material selected by a user to view. For example, a user may select program channel 2 to view program material provided by CBS, program channel 14 to view program material provided by ESPN, etc.

In addition to the in-band transmission channels, downstream data, e.g., system messages, is communicated from headend 120 to STTs via one or more forward data channels (FDCs). These FDCs, sometimes referred to as "out-of band" channels, may occupy, e.g., the 70-130 MHz band of a coaxial cable, and may each have 1 MHz bandwidth. For example, signals containing the downstream data are modulated by modems in quaternary phase shift keying (QPSK) modem pool 139 onto the FDCs, in accordance with a QPSK modulation scheme.

STTs may utilize reverse data channels (RDCs) for sending upstream data, including the aforementioned real-time and NRT data, to headend 120. RDCs may occupy, e.g., the 5-40 MHz band of a coaxial cable, and may each have 1 MHz bandwidth. Signals containing upstream data in RDCs are modulated in accordance with a QPSK modulation scheme. Modems in pool 139 receive the QPSK signals in the RDCs and performs any necessary demodulation before transmitting the signals to headend 120.

As specified by Digital Audio Visual Council (DAVIC), a standard setting organization, for communications purposes, each STT and network controller 210 are identified by the Internet protocol (IP) addresses assigned thereto. However, these IP addresses may be reassigned each time the broadband communication system is reconfigured. As a result, the IP address of an STT or that of network controller 210 may change after a system reconfiguration. Nevertheless, each STT and network controller 210 are also assigned a media access control (MAC) address on a permanent basis, surviving any system reconfiguration.

Figure 2:
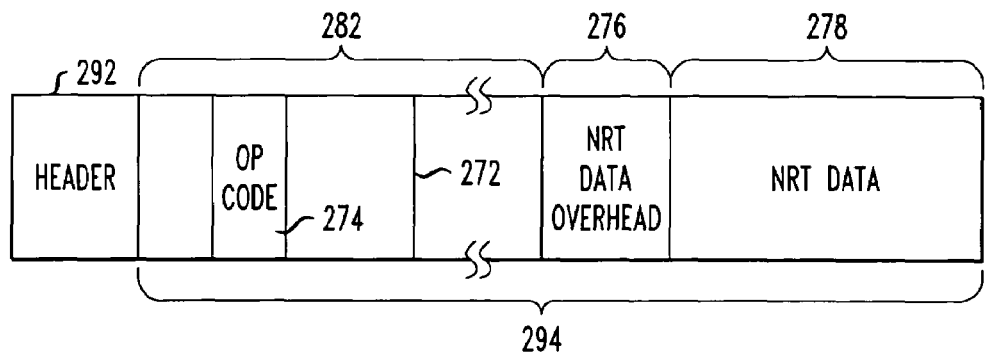
FIG. 2 illustrates a data cell containing both real-time data and NRT data in accordance with the invention.

Transport of data through network 150 may be realized using, e.g., ATM technology. As is well known, the ATM transport is cell based. Data to be transmitted through network 150 is packaged in units of cells. FIG. 2 illustrates ATM cell 291 which comprises header 292 and information section 294. Header 292 includes, among others, well known virtual path identifier (VPI) and virtual channel identifier (VCI) fields for routing cell 291 to a desired destination. Information section 294 can accommodate up to 48 bytes of data to be transmitted, also referred to as the "payload."

In this illustrative embodiment, STTs transmit ATM cells containing the aforementioned real-time data and NRT data over network 150 in accordance with the well known Aloha protocol. The Aloha protocol is a contention-based access protocol according to which each STT is allowed to transmit data to the network whenever it has data to transmit. The original version of Aloha operates on a continuous time basis. Because the possibility of data collision is significant, each STT monitors its transmission by listening to acknowledgment from the network that a transmission was successful. If a transmission was unsuccessful, the data is re-transmitted after a random amount of time to reduce the probability of another collision. Of course, other contention-based access protocols may be used instead of the Aloha protocol, including, e.g., its improved version, the slotted Aloha protocol operating on a time slot basis.

Figure 3:
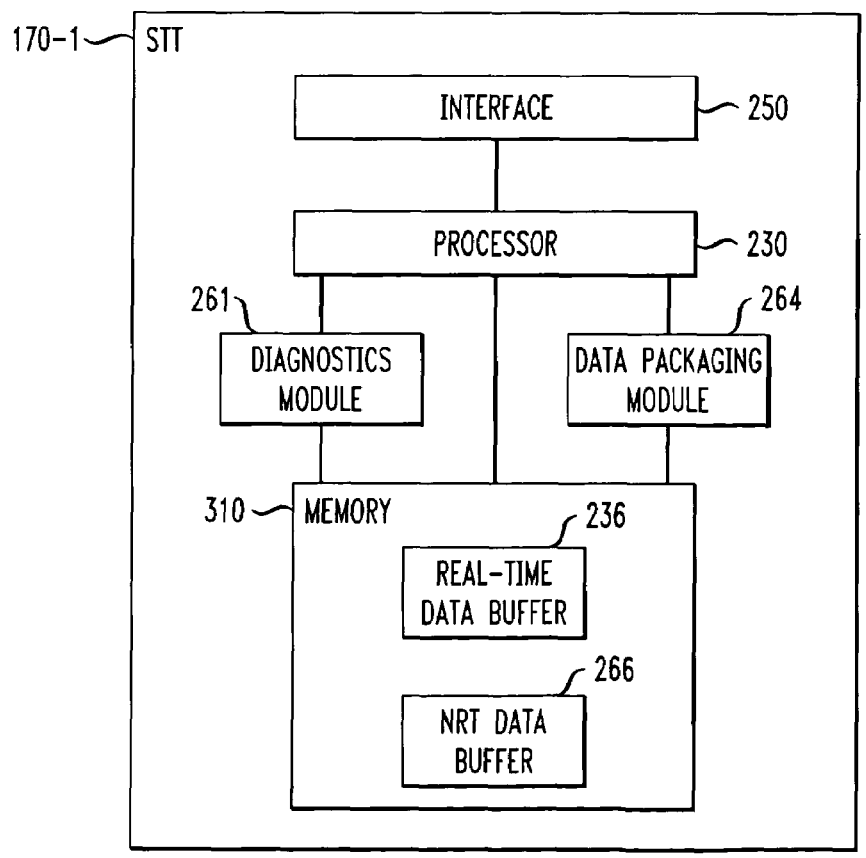
FIG. 3 illustrates a set-top terminal in accordance with the invention.

FIG. 3 illustrates components of a representative STT, say, STT 170-1, which include, among others, processor 230, interface 250, diagnostic module 261, data packaging module 264, and memory 310. Processor 230 orchestrates the operations of STT 170-1. For example, processor 230 may receive trick mode commands initiated by a user and format such commands in accordance with an appropriate protocol for transmission to headend 120. In one implementation, processor 230 formats the trick mode commands in accordance with the well known Lightweight Stream Control Protocol (LSCP), described, e.g., in "Lightweight Stream Control Protocol," Time Warner Cable, Ver. 1.0, Jun. 10, 1999. In this implementation, when STT 170-1 receives from a user a trick mode command such as a play, pause, rewind or fast-forward command, processor 230 identifies such a command as one requiring immediate transmission to headend 120. Processor 230 accordingly generates an appropriate LSCP request and places it in real-time (RT) data buffer 236 for immediate transmission to headend 120 through interface 250. To that end, data packaging module 264 generates an ATM cell, say cell 291, which includes proper routing information in header 292, and the LSCP request (denoted 272) from buffer 236 in information section 294. In accordance with the well known LSCP, request 272 includes, among other fields, field 274 containing an op code identifying the request as one containing a particular trick mode command in this instance. It has been recognized that the real-time data, e.g., request 272, for which an ATM cell is generated oftentimes occupies only a portion of information section 294. Such an ATM cell typically is transmitted instantly because of the real-time nature of request 272, without fully utilizing the capacity of section 294 in prior art. However, in accordance with the invention, the unused capacity of section 294 is employed to transport NRT data in a manner described below.

As mentioned before, NRT data may relate to program channel changes and other aspects of a user's behavior. For example, if a user changes from program channel 2 to program channel 9 at 4:30 p.m. on Jun. 19, 20xx, processor 230 may generate one or more data items reflecting the program channel change, and the date and time thereof. In this instance, processor 230 temporarily stores any such NRT data items in NRT data buffer 266.

Diagnostics module 261 measures various activities that take place within STT 170-1 or within network 150, and generates data reflecting these measurements.

Diagnostic data may be used by the cable operator to monitor and maintain the performance of STT 170-1 and of network 150. Diagnostics module 261 may, for example, measure signal-to-noise ratios of an incoming cable feed. Typically, data generated by diagnostics module 261 need not be transmitted to headend 120 in real-time; therefore, such data constitutes NRT data, which is collected in NRT data buffer 266 as well.

It should be noted that the NRT data may be compressed, in accordance with a well known data compression technique, to more efficiently utilize the limited network bandwidth. In one implementation, the NRT data is compressed by means of offset techniques. In another implementation, delta techniques may be used. To further reduce the quantity of NRT data, the NRT data may be filtered, e.g., to remove data resulting from a user's "channel surfing." For instance, where a user remains tuned to a respective channel for less than five seconds, the channel change information indicating that the respective channel was viewed is discarded.

Figure 4:
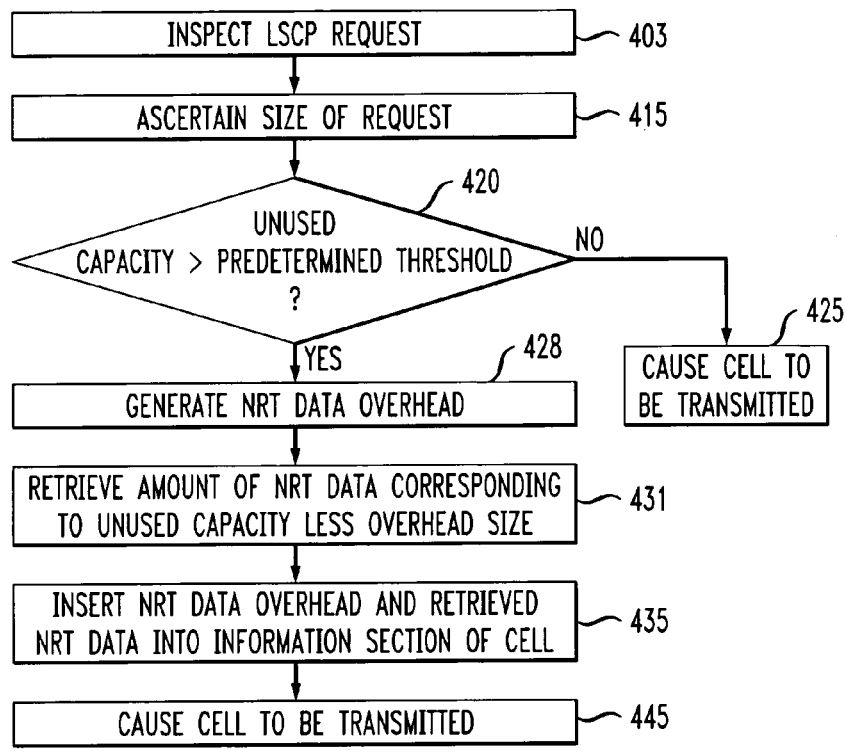
FIG. 4 is a flowchart depicting a process for packaging both real-time and NRT data in the data cell of FIG. 2.

In this instance, in accordance with the invention, data packaging module 264 when generating cell 291 inspects LSCP request 272 and, in particular, the op code in field 274 identifying the request, as indicated at step 403 in FIG. 4. At step 415, data packaging module 264 ascertains the size (or the byte length) of request 272, e.g., by looking up table 530 in FIG. 5 based on the op code. Otherwise, the size of the real-time data to be transmitted may be explicitly specified in a field which accompanies the real-time data and indicates its byte count as part of the data protocol.

Figure 5:
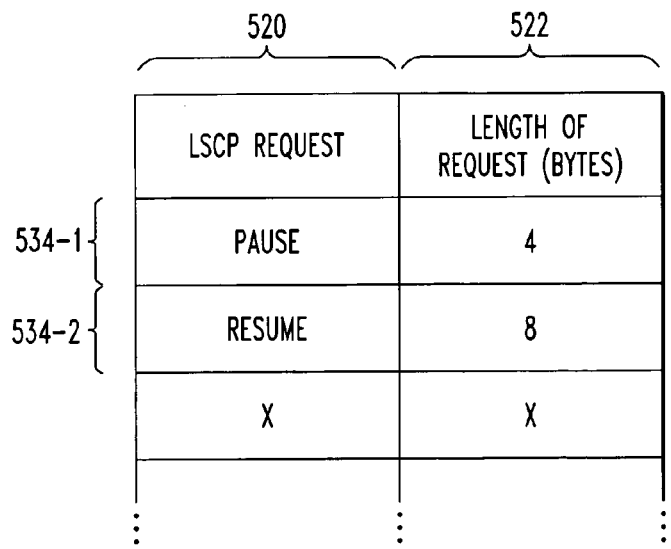
FIG. 5 illustrates a table for looking up the byte length of a given real-time request.

As illustrated in FIG. 5, table 530 contains columns 520 and 522. Column 520 contains various LSCP requests which may be transmitted from STT 170-1 to headend 120 and which are identified by different op codes. Column 522 contains, for each respective LSCP request in column 520, the length of the request. Referring to row 534-1, for example, the "pause" request has a length of four bytes. Referring to row 534-2, the "resume" request has a length of eight bytes. The various requests, and the length of each, are known a priori according to the protocol used, e.g., the LSCP in this instance.

At step 420, data packaging module 264 determines whether information section 294 of cell 291 has unused capacity greater than a predetermined threshold. For example, module 264 may determine the amount of unused capacity by subtracting the byte length of request 272 and that of other real-time data accompanying the request from the known full capacity of section 294, which is forty-eight bytes in this instance. Such other real-time data may include an identifier (e.g., MAC address or IP address) identifying the STT 170-1 from which the request originates.

The aforementioned predetermined threshold may correspond to an overhead for transporting NRT data in cell 291. For example, the NRT data overhead may also include an identifier identifying STT 170-1 from which the NRT data originates. However, such an identifier may be redundant especially when its provision is required among the real-time data. In addition, the NRT data overhead may include a sequence number for use by headend 120 to place cell 291 in proper order among other cells also received from STT 170-1. The sequence number is indicative of the relative transmission time of cell 291 to those of the other cells from the same STT. The use of the sequence number is especially important here in that the NRT data is sent in pieces over multiple cells, which may be received at headend 120 out of order. It suffices to know for now that data cell inspection server 222 in headend 120, among others, reads the NRT data overheads of the received cells, and places the cells from the same STT in proper sequential order based on their sequence number and STT identifier.

If it is determined at step 420 that the unused capacity in section 294 is smaller than or equal to the predetermined threshold, module 264 causes cell 291 to be transmitted, as indicated at step 425. Otherwise, module 264 proceeds to step 428 where it generates the aforementioned NRT data overhead including a new sequence number (e.g., previous sequence number+1). At step 431, module 264 retrieves from NRT data buffer 266 an amount of NRT data corresponding to the unused capacity less the overhead size. Barring any specified priority, the NRT data is retrieved in accordance with a first-in-first-out (FIFO) methodology.

At step 435, module 264 inserts NRT data overhead (denoted 276) and the retrieved NRT data (denoted 278) into information section 294 of cell 291 containing real-time data 282. At step 445, module 264 causes cell 291 to be transmitted to headend 120 through interface 250.

For fear of any NRT data loss due to an overflow of buffer 266, module 264 also monitors the data volume in NRT data buffer 266. If module 264 detects that buffer 266 is about to be full, module 264 may retrieve a certain amount of NRT data from buffer 266 and send the retrieved data to headend 120 immediately, without waiting for any underused real-time data cell.

Returning to FIG. 1, data cell inspection server 222 in headend 120 receives ATM cells sent from STTs, e.g., STTs 170-1 through 170-L, and inspects each cell for real-time data, e.g., request 272. Server 222 extracts any real-time data in the cell and conveys the same to controller 210 for immediate processing. Server 222 also determines if the cell contains an NRT data overhead, indicative of presence of NRT data. In addition, as mentioned before, server 222 places the cells from the same STT in proper sequential order based on the sequence number and STT identifier in their NRT data overhead. Server 222 extracts the NRT data from the sequenced cells and transmits it to data collection server 223. Data collection server 223 decompresses (if necessary) the NRT data received from data cell inspection server 222. Server 223 makes available the received NRT data for analysis in a conventional manner.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the real-time data and NRT data are transported in ATM cells. However, the invention equally applies to other forms of data container suitable for data transport, e.g., packets.

In addition, in the disclosed embodiment, the predetermined threshold with which the unused capacity of a real-time data cell is compared may have a zero value especially if no NRT data overhead needs to be transmitted.

Moreover, in the disclosed embodiment, an NRT data overhead may include a sequence number for coalescing pieces of NRT data transmitted over multiple real-time data cells at the headend. In a second embodiment, the NRT data which comprises discrete data items is transmitted on a data item by data item basis, even though the unused capacity of a cell may not be filled. Because in this second embodiment the NRT data items are not sent in pieces, the use of the sequence number may be obviated.

Finally, each of headend 120 and STT 170-1 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for communicating data to a location through a communications network, comprising:
    a mechanism for identifying first data, which is accorded a higher priority than second data to be processed in the location, a data object for transporting the first data being generated in response to an identification of the first data, the data object having:
        a predetermined data transport capacity,
        a header, and
        an information section,
    the first data being contained in the information section of the data object, the first data being without any data overhead portion associated with the first data within the information section;
    a device for determining whether the predetermined data transport capacity exceeds the size of the first data by at least a threshold, at least some of the second data being inserted into the information section of the data object when it is determined that the predetermined transport capacity exceeds the size of the first data by at least the threshold; and
    an interface for providing the data object to the location.

2. The system of claim 1 wherein the communications network includes a cable network.

3. The system of claim 2 wherein the location includes a headend.

4. The system of claim 1 wherein the data object includes a data cell in an asynchronous transfer mode (ATM) format.

5. The system of claim 1 wherein the data object includes a packet.

6. The system of claim 1 wherein the threshold has a zero value.

7. The system of claim 1 wherein the threshold corresponds to the size of an overhead associated with the inserted second data.

8. The system of claim 7 wherein the overhead includes an indicator indicative of a placement of the inserted second data among the rest of the second data.

9. The system of claim 1 further comprising a processor for presenting an entertainment program, wherein the first data includes data representing a command for manipulation of a presentation of the entertainment program.

10. The system of claim 9 wherein the presentation includes a video-on-demand (VOD) presentation.

11. The system of claim 9 wherein the manipulation includes a selected one of a fast-forward, rewind, play and pause of the presentation.

12. The system of claim 1 further comprising a processor responsive to a user request for selectively presenting entertainment programming content, wherein the second data concerns selections of entertainment programming content presentations.

13. The system of claim 1 wherein the second data concerns diagnostics of at least part of the system.

14. Apparatus responsive to a command initiated by a user to affect a presentation of an entertainment program, comprising:
    a processor for generating first data for effecting the command, the first data being accorded a higher priority than second data to be processed in a location remote from the apparatus;
    a device for generating a data object for transporting the first data, the data object having: (i) a header, and (ii) an information section, the first data utilizing a portion of a data transport capacity of the information section in the data object, resulting in unused data transport capacity in the information section of the data object, the first data being contained in the information section of the data object, the first data being without any data overhead portion associated with the first data within the information section, at least some of the second data being inserted in the information section of the data object to utilize the unused data transport capacity; and
    an interface for sending the data object to the remote location for processing thereof.

15. The apparatus of claim 14 comprising a set-top terminal.

16. The apparatus of claim 14 wherein the remote location includes a headend in a broadband communications system.

17. The apparatus of claim 16 wherein the broadband communications system includes a cable network.

18. The apparatus of claim 14 wherein the data object includes a data cell in an ATM format.

19. The apparatus of claim 14 wherein the data object includes a packet.

20. The apparatus of claim 14 wherein the presentation includes a VOD presentation.

21. The apparatus of claim 14 wherein the command concerns a selected one of a fast-forward, rewind, play and pause of the presentation.

22. The apparatus of claim 14 further comprising a processor responsive to a user request for selectively presenting entertainment programming content, wherein the second data concerns selections of entertainment programming content presentations.

23. The apparatus of claim 14 wherein the second data concerns diagnostics of at least part of the apparatus.

24. A method for use in a system for communicating data to a location through a communications network, the method comprising:
    identifying first data, which is accorded a higher priority than second data to be processed in the location;
    generating a data object for transporting the first data in response to an identification of the first data, the data object having:

a predetermined data transport capacity,
a header, and
an information section,
the first data being contained in the information section of the data object the first data being without any data overhead portion associated with the first data within the information section;
determining whether the predetermined data transport capacity exceeds the size of the first data by at least a threshold;
inserting at least some of the second data into the information section of the data object when it is determined that the predetermined transport capacity exceeds the size of the first data by at least the threshold; and
providing the data object to the location.

25. The method of claim 24 wherein the communications network includes a cable network.

26. The method of claim 25 wherein the location includes a headend.

27. The method of claim 24 wherein the data object includes a data cell in an ATM format.

28. The method of claim 24 wherein the data object includes a packet.

29. The method of claim 24 wherein the threshold has a zero value.

30. The method of claim 24 wherein the threshold corresponds to the size of an overhead associated with the inserted second data.

31. The method of claim 30 wherein the overhead includes an indicator indicative of a placement of the inserted second data among the rest of the second data.

32. The method of claim 24 further comprising presenting an entertainment program, wherein the first data includes data representing a command for manipulation of a presentation of the entertainment program.

33. The method of claim 32 wherein the presentation includes a video-on-demand (VOD) presentation.

34. The method of claim 32 wherein the manipulation includes a selected one of a fast-forward, rewind, play and pause of the presentation.

35. The method of claim 24 further comprising selectively presenting entertainment programming content in response to a user request, wherein the second data concerns selections of entertainment programming content presentations.

36. The method of claim 24 wherein the second data concerns diagnostics of at least part of the system.

37. A method for use in an apparatus responsive to a command initiated by a user to affect a presentation of an entertainment program, the method comprising:
generating first data for effecting the command, the first data being accorded a higher priority than second data to be processed in a location remote from the apparatus;
generating a data object for transporting the first data, the data object having: (i) a header, and (ii) an information section, the first data utilizing a portion of a data transport capacity of the information section in the data object, resulting in unused data transport capacity in the information section of the data object, the first data being contained in the information section of the data object, the first data being without any data overhead portion associated with the first data within the information section;
inserting at least some of the second data in the information section of the data object to utilize the unused data transport capacity; and
sending the data object to the remote location for processing thereof.

38. The method of claim 37 wherein the data object includes a data cell in an ATM format.

39. The method of claim 37 wherein the data object includes a packet.

40. The method of claim 37 wherein the presentation includes a VOD presentation.

41. The method of claim 37 wherein the command concerns a selected one of a fast-forward, rewind, play and pause of the presentation.

42. The method of claim 37 further comprising selectively presenting entertainment programming content in response to a user request, wherein the second data concerns selections of entertainment programming content presentations.

43. The method of claim 37 wherein the second data concerns diagnostics of at least part of the apparatus.

* * * * *